ELECTRICAL CIRCUIT

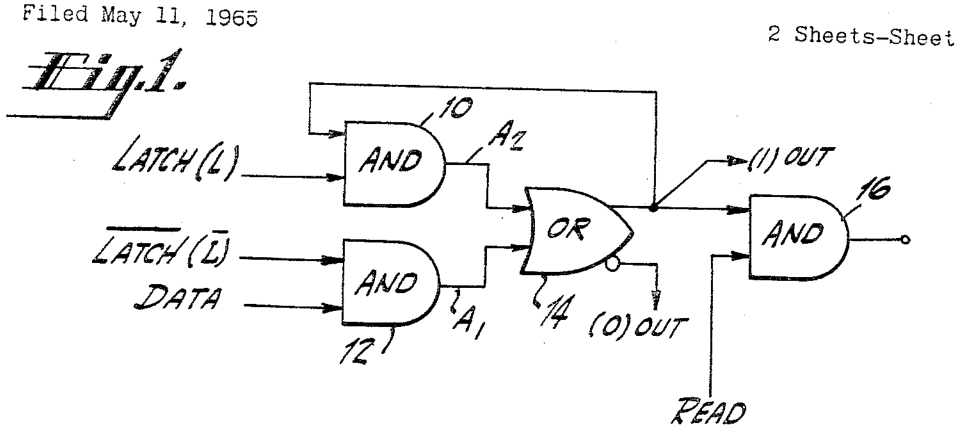
Fig. 1.
| | UNLATCH | LATCH | UNLATCH | LATCH |
|---|---|---|---|---|
| $\bar{L}$ | 1 | 0 | 1 | 0 |
| D | 0 | 0 | 1 | 1 |
| $A_1$ | 0 | 0 | 1 | 0 |
| (1) | 0 | 0 | 1 | 1 |
| L | 0 | 1 | 0 | 1 |
| $A_2$ | 0 | 0 | 0 | 1 |
Fig. 2.
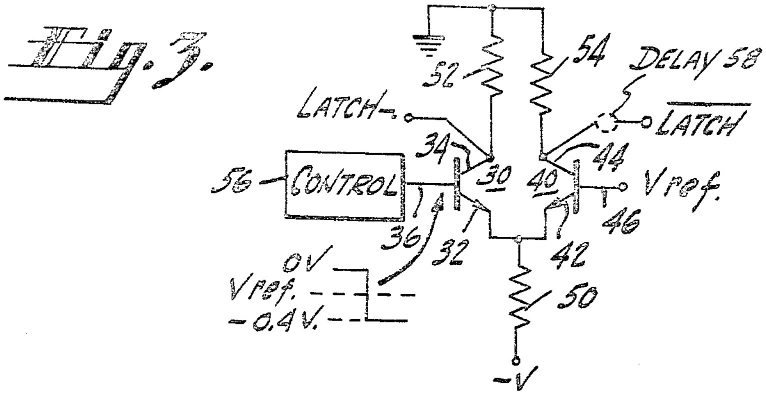
Fig. 3.
INVENTOR.
RICHARD H. BERGMAN
BY John V. Regan
Attorney Aug. 29, 1967 R. H. BERGMAN 3,339,089

Filed May 11, 1965 2 Sheets-Sheet 2

INVENTOR.
RICHARD H. BERGMAN
BY John V. Regan
Attorney 3,339,089
ELECTRICAL CIRCUIT Richard H. Bergman, Cinnaminson, N.J., assignor to Radio Corporation of America, a corporation of Delaware Filed May 11, 1965, Ser. No. 454,794
11 Claims. (Cl. 307—88.5)

This invention relates to electrical circuits and, in particular, to data storage circuits of the type frequently referred to as "latching" circuits.

For present purposes, a latching circuit may be defined generally as a storage circuit having one data input terminal and at least one control input terminal, characterized in that the circuit is immune to data input signals applied in the absence of a control or gating signal. When a gating signal is applied, the circuit assumes an operating state determined by the applied input data. The circuit becomes "latched" or locked in this state when the gating signal is removed, and remains locked in this state until the next gating signal is applied. One advantage of such a laching circuit is that data may be entered or "jammed" into the circuit without first having to reset the circuit to a reference condition, whereby the circuit has particular application in register-to-register data transfers, and as storage cells in computer memories, shift registers and the like.

It is among the objects of this invention to provide an improved latching circuit which is capable of very high speed operation.

It is another object of this invention to provide an improved latching circuit in which the entire latching operation may be performed during a single stage delay.

It is a further object of this invention to provide a latching circuit which lends itself readily to fabrication in monolithic form and which operates reliably with very low amplitude signal swings.

A circuit embodying the invention may include first and second emitter coupled current steering logic gates each comprising three transistors. A fixed potential is applied at the base of one transistor in each gate, and the collectors of these transistors are connected directly in common, and by way of a common collector supply resistor to a source of suitable operating potential. The common voltage at these collectors is coupled to the base of a second transistor in one gate, and a gating signal is applied selectively at the base of the third transistor in that one gate. Data input signals and the complement of the gating signal are applied at the bases of different ones of the second and third transistors in the other gate.

In the accompanying drawing, like reference numerals denote like components, and:

FIGURE 1 is a generalized block diagram of a latching circuit;

FIGURE 2 is a "truth" table useful in explaining the operation of the block diagram;

FIGURE 3 is a schematic diagram of a current steering logic gate which may be used to derive the gating signal and its complement;

Figure 4:
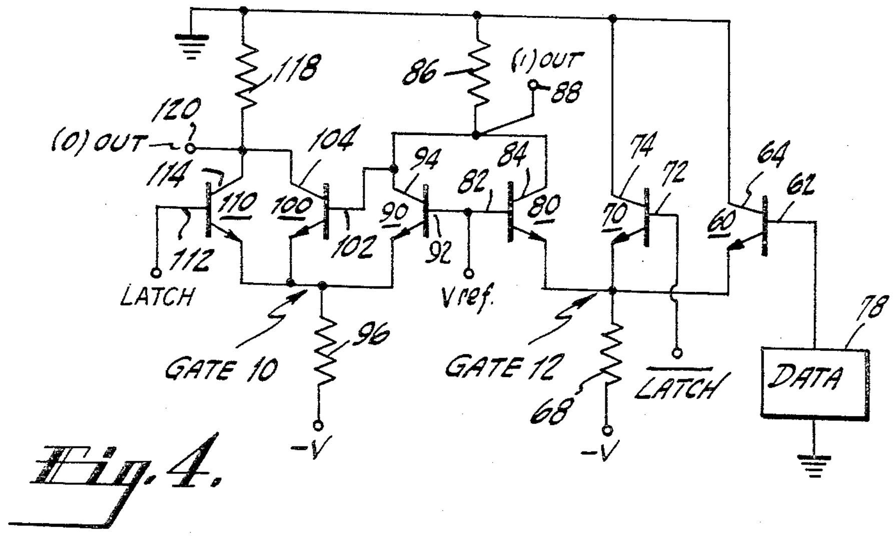
FIGURE 4 is a schematic diagram of a latching circuit embodying the invention.

As is known in the prior art, a latching circuit may be implemented by a combination of AND and OR gates. In general, and AND gate may be defined as a gate having two or more inputs and one output, which has the property that its output is in a specified state only when every input is in that specified state. In particular, the output of the AND gate is a signal or level representing a binary "1" only when all of the inputs thereto are binary "1" signals or levels. An OR gate, on the other hand, is a gate or circuit in which the output is a signal or level representing binary "1" whenever any one or more of the input signals or levels are binary "1."

As shown in FIGURE 1, a latching circuit from a logic standpoint may comprise a pair of AND gates 10, 12 having their respective outputs applied as inputs to an OR gate 14. The output of the OR gate 14 is fed back to one input of the first AND gate 10. A second input to this gate 10 is a gating or control signal or level designated "latch." The complement, or $\overline{\text{latch}}$, of the gating signal or level is applied at one input of second AND gate 12, and data input signals are applied as a second input to AND gate 12.

The usual type of OR gate has only a single output. When the latch circuit is used in some register or storage applications, both the normal output and its complement are required. The complement output may be derived by inverting the "true" output of the OR gate. Alternatively, the OR gate 14 may be a current steering logic gate which produces both the true and complement outputs directly. The true and complement outputs are labeled "(1)" and "(0)," respectively in FIGURE 1. When the latching circuit is used as a memory cell, for example in a high speed memory, it is usually desirable to interrogate the memory cell without destroying the information stored therein. This may be accomplished, for example, by coupling the (1) output of OR gate 14 to one input of a third AND gate 16. A second input to AND gate 16 is a binary "1" control signal, designated "read" which is applied whenever it is desired to sample the output of the memory cell.

Operation of the latching circuit arrangement may best be understood from a consideration of the "truth" table of FIGURE 2. The latching circuit has two distinct conditions of operation, namely LATCH and UNLATCH conditions. Briefly stated, the circuit is operated in the unlatched condition whenever it is desired to enter new information into the circuit. During the latched condition the state of the circuit is immune to applied data signals. In the unlatch operation, the gating signal LATCH is a binary "0" input signal or level and the complement of the latching signal, or $\overline{\text{LATCH}}$, is a binary "1" signal or level. During the latch operation, these gating signals have the opposite significance.

Consider now the unlatch operation. The LATCH input to first AND gate 10 is a binary "0" input, whereby the output $A_2$ of this gate is a binary "0" signal. The $\overline{\text{LATCH}}$ input to second AND gate 12 is a binary "1" signal or level, whereby the output $A_1$ of this gate is determined by the value of the data input signal. Assume first that the data input is a signal or level representing a binary "0." The output $A_1$ of AND gate 12 then is binary "0." Since both of the inputs to OR gate 14 are binary "0" inputs, the (1) output of the OR gate is binary "0," and this output is fed back to the first AND gate 10. The various signals or levels aforementioned are shown in the first full column of FIGURE 2 under the heading "unlatch."

The circuit becomes latched when the LATCH input to first AND gate 19 switches to binary "1" and the $\overline{\text{LATCH}}$ input to second AND gate 12 switches to binary "0." The LATCH input primes one input of AND gate 10. However, since the feedback from OR gate 12 is a binary "0" signal or level, the output $A_2$ of AND gate 10 remains at binary "0." Since $\overline{\text{LATCH}}$ is at the binary "0" level, second AND gate 12 is immune to data signals applied at this time, and the output $A_1$ of gate 12 remains at binary "0." Both inputs to OR gate 14 are binary "0" levels, whereby the "1" output thereof is a binary "0" level. Thus, the circuit has "latched" onto the data input signal condition which existed when the circuit changed from the unlatched to the latched condition, and the circuit continues to store this condition until the next unlatch operation.

Assume that at the next unlatch operation a binary "1" data input is applied to second AND gate 12. The $\overline{\text{LATCH}}$ input to this gate also is at the binary "1" level during the unlatch period, whereby the output $A_1$ is at the binary "1" level (column 3, FIGURE 2). This output enables the OR gate 14, and the (1) output thereof switches to the binary "1" level. The latter output, however, does not pass through first AND gate 10 because the LATCH input thereto is at the binary "0" level.

When the circuit is changed to the latched condition, the LATCH input to gate 10 changes to a binary "1" level and fully enables first AND gate 10. Output $A_2$ thereof becomes a binary "1" level which passes through OR gate 14 and maintains the (1) output thereof at the binary "1" level. Thus, the circuit stores the data input signal which was applied during the unlatched condition. This state of storage cannot be changed during the latch condition because the $\overline{\text{LATCH}}$ input to second AND gate 12 is at the binary "0" level, whereby AND gate 12 is insensitive to changes applied at the data input.

Any change in the output of OR gate 14 during the unlatch period does not occur concurrently with a change in the input to AND gate 12. Rather, the change in output of OR gate 14 is delayed an amount equal to the sum of the delays of AND gate 12 and OR gate 14. Also, since the (1) output is fed back to one input of first AND gate 10, reliable operation of the arrangement requires that the unlatch period be at least as long as the sum of the delays through AND gate 12 and OR gate 14, or two stage delays. It is one feature of the latching circuits of the present invention that the delay between input and output and, hence, the duration of the unlatch period, may be reduced to a single stage delay. Such reduction in delay is of particular importance in applications where time is of the essence, for example when the latch circuit is used as a memory cell or as a stage in a memory register connected in a memory regeneration loop.

It should be noted that a race condition can occur in the FIGURE 1 arrangement during an unlatch-to-latch transition. In particular, this race condition can occur if the delay between the input and output of second AND gate 12 is of shorter duration than the delay through first AND gate 10. Likewise, the undesirable condition can occur if the $\overline{\text{LATCH}}$ input switches to a binary "0" level before the LATCH input switches to a binary "1" level. In either event, the output $A_1$ of second AND gate 12 can become binary "0" before the output $A_2$ of first AND gate 10 can become a binary "1," whereby there can be a loss of the data when a binary "1" is to be stored. Such undesirable transition can be avoided either by delaying the $\overline{\text{LATCH}}$ input to second AND gate 12 or by delaying the output of this gate. The manner in which the undesirable transition is avoided in a circuit embodying the invention will be discussed more fully hereinafter.

FIGURE 3 is a schematic diagram of an emitter coupled current steering logic circuit which can be used to generate the required gating signal and its complement. Although the operation of such a circuit is known in the art, the more important details will be described here inasmuch as the current steering logic gate is fundamental to the latching circuits embodying the invention. The circuit of FIGURE 3 includes first and second transistors 30 and 40 of one conductivity type, illustrated as NPN type, having their emitter electrodes 32, 42 connected directly in common and by way of a common emitter resistor 50 to a source of operating potential, designated —V. This source may be, for example, a battery having its negative terminal connected at the lower end of resistor 50 and having its positive terminal connected to circuit ground. The collectors 34 and 44 are connected by way of separate current supply resistors 52, 54, respectively, to a point of different operating potential, illustrated as circuit ground.

As mentioned previously, the gating signals are bivalued and have either a value corresponding to a binary "1" data signal or a value corresponding to a binary "0" data signal. In particular, a binary "0" bit may be represented by a voltage of ground potential, and a binary "1" bit may be represented by —0.4 volt. The base 46 of transistor 40 is connected to a point of fixed potential, designated "$V_{ref}$," which preferably has a value midway between the binary "1" and binary "0" voltage values, or —0.2 volt. The base 36 of transistor 30 is coupled to the output of a box 56, labeled "control." In a computer, for example, the control may be a part of the program control unit.

During a latch operation, the output of the control 56 is a level at ground potential. Since the voltage at the base 36 is more positive than the reference voltage at base 46, transistor 30 is rendered conductive, and the voltage at the common emitter junction has such a value that the other transistor 40 is nonconducting. Common emitter resistor 50 and the —V volt source may operate substantially as a constant current means, whereby all of the current flows in the emitter circuit of transistor 30. The value of collector resistor 52 is chosen relative to the values of the emitter resistor 50 and —V so that the output voltage at collector 34 has a value of —0.4 volt when transistor 30 is conducting. The output voltage at the other collector 44 is at ground potential at this time due to the nonconduction of transistor 40. Thus, the output designated LATCH has a value corresponding to a binary "1" and the output designated $\overline{\text{LATCH}}$ has a value corresponding to a binary "0."

When the output of the control unit 56 is switched to —0.4 volt, transistor 30 becomes nonconducting and transistor 40 is rendered conductive. All of the current in the constant current means flows in the emitter circuit of transistor 40. The output LATCH at collector 34 then is at ground potential corresponding to a binary "0." Collector resistor 54 is chosen to have such a value that the output $\overline{\text{LATCH}}$ at collector 44 has a value of —0.4 volt, corresponding to a binary "1." Note that in all cases the two outputs are complementary in the sense that when one output is a binary "0" the other output is a binary "1," and vice-versa.

It is the property of an emitter coupled current steering logic gate that the transitions at both outputs occur substantially concurrently. One possible exception is where a transistor is switched from a condition of deep saturation to a cut-off condition. However, because of the very low level input voltage swing in FIGURE 3, the collector voltage of either transistor never becomes more negative than its input voltage by more than about 0.4 volt, which value is insufficient in many present day transistors to place the transistor in deep saturation.

Consider now the latching circuit illustrated schematically in FIGURE 4. Basically, the circuit comprises a pair of negative AND gates 10, 12 having a common output. Gate 12 includes three transistors 60, 70, 80 having their emitter electrodes connected directly in common and by way of a common emitter resistor 68 to the —V volt source. The gating signal $\overline{\text{LATCH}}$ is applied at the base 72 of transistor 70 and input data from a source 78 is applied at the base 62 of transistor 60. Both of these transistors have their collector electrodes 74 and 64 connected directly to circuit ground. Transistor 80 has its base electrode 82 connected to the fixed potential $V_{ref}$, and has its collector electrode 84 connected by way of a supply resistor 86 to circuit ground. An output terminal 88 also is connected at the collector electrode 84. This terminal 88, as will become apparent, corresponds to the "1" output terminal of the OR gate 14 in FIGURE 1.

Gate 10 (FIGURE 4) also includes three transistors 90, 100 and 110 which are of the same conductivity type as the transistors in the other gate. These transistors have their emitter electrodes connected directly in common, and by way of a supply resistor 96 to the —V volt source. Transistor 90 has its collector electrode 94 connected directly in common to the collector electrode 84 of transistor 80 in the other gate, whereby output terminal 88 is common to the collector electrodes of these transistors. The fixed voltage $V_{ref}$ is applied to the base 92 of transistor 90. Transistor 100 has its base connected directly to a point common to the collector electrodes 84 and 94, and transistor 110 has its base 112 coupled to receive the LATCH input. The collectors 104 and 114 of the latter transistors are connected directly in common and by way of a collector supply resistor 118 to circuit ground. The output terminal 120 at the common collector connection corresponds to the "0" output terminal of the OR gate 14 (FIGURE 1).

During the latch condition of the circuit, the LATCH input to transistor 110 has a value corresponding to a binary "1," which may be −0.4 volt for the conditions given in FIGURE 3. The complement of this input, or $\overline{\text{LATCH}}$, applied at the base 72 of transistor 70 has a value corresponding to a binary "0" at this time. Since the $\overline{\text{LATCH}}$ input is more positive than $V_{ref}$, transistor 70 is rendered conductive and transistor 80 is maintained in a nonconducting state. Thus, the (1) output at terminal 88 is insensitive to the output of the data source 78 since transistor 70 maintains transistor 80 in a nonconducting state regardless of the data input.

At the latch-to-unlatch transition, the LATCH input changes from −0.4 volt to zero volts, corresponding to a binary "0," and input $\overline{\text{LATCH}}$ switches from ground potential to −0.4 volt. Transistor 110 is rendered conductive by the LATCH input and causes transistor 90 to become or remain nonconducting during the unlatch period. Assume first that the output of data source 78 is a signal representing binary "0" (ground potential). This input renders transistor 60 conducting, whereby transistor 80 remains nonconducting. With both transistors 80 and 90 nonconducting, no signal current flows through the common collector resistor 86, and the (1) output voltage at terminal 88 is at ground potential, representing a binary "0" output. This output is applied at the base 102 of transistor 104, whereby transistor 100 conducts. It should be noted that the input voltage at base 102 corresponds to a binary "0" and is compatible with the inputs to the other transistors.

At the termination of the unlatch period, the LATCH input changes to −0.4 volt and renders transistor 110 nonconducting. However, transistor 100 continues to conduct and maintains transistor 90 in a nonconducting condition, whereby the (0) output at terminal 120 remains at −0.4 volt corresponding to a binary "1." The input $\overline{\text{LATCH}}$ switches from −0.4 volt to ground potential during the unlatch-to-latch transition, and renders transistor 70 conducting. Therefore, transistor 80 remains nonconducting and there is no change in voltage at the (1) output terminal 88. The voltage at terminal 88 is at ground potential, corresponding to a binary "0," which is the same as the data supplied by the source 78 during the unlatch period. Thus, the circuit has "latched" in an operating state determined by the output of data source 78.

Consider now the effect of a change in output of the data source 78 from binary "0" to binary "1," that is, from ground potential to −0.4 volt. This change has no effect on the operation of the circuit during the latch period because transistor 70 is conducting and remains conducting regardless of the input from the data source 78. Therefore, transistor 80 remains in a nonconducting condition regardless of the output of the data source 78. However, the change in output of the data source 78 is effective to switch the operating state of the circuit during the next unlatch period. For example, at the latch-to-unlatch transition, input LATCH rises from −0.4 volt to ground potential and renders transistor 110 conducting. Input $\overline{\text{LATCH}}$ falls to −0.4 volt. With −0.4 volt applied at the bases 62 and 72 of transistors 60 and 70, respectively, both of these transistors are rendered nonconductive, whereupon transistor 80 turns on. Current flows, in the conventional sense, through collector resistor 86, the collector 84-emitter path of transistor 80 and through resistor 68 to the −V volt source. As discussed earlier in connection with the circuit of FIGURE 3, the collector resistor 86 may be chosen to have a value such that the signal current therethrough reduces the collector voltage to −0.4 volt, corresponding to a binary "1." This voltage appears at the (1) output terminal 88, and is also applied at the base electrode 102 of transistor 100, biasing transistor 100 off.

At the next unlatch-to-latch transition, transistor 110 is rendered nonconducting. Since transistor 100 also is nonconducting, transistor 90 turns on and maintains the voltage at output terminal 88 and at base 102 at −0.4 volt, corresponding to a binary "1." Thus, the circuit is latched in a state determined by the data input at base 62. With transistors 100 and 110 nonconducting, the voltage at output terminal 120 it at ground potential, corresponding to a binary "0." Thus, the outputs at terminals 88 and 120 are complementary. Transistor 70 is rendered conducting at the unlatch-to-latch transition and causes transistor 80 to turn-off. Since transistor 90 has been rendered conductive, the turn-off of transistor 80 at the end of the unlatch period has no effect on the output at terminal 88. This assumes, of course, that transistor 80 does not turn off before transistor 90 turns on. It is at this point that a race condition is possible.

For reasons which were discussed in connection with the FIGURE 3 circuit, the change in output voltages at the two halves of a current steering logic gate occur substantially concurrently unless one of the transistors is in deep saturation. Since the transistor 80 of FIGURE 4 is being switched from the on to the off condition, any saturation in this transistor will aid in preventing the race condition aforementioned. Also, when the circuit is fabricated in monolithic form, the characteristics of the various transistors are substantially similar, whereby there should be no substantial difference in the turn-on and turn-off characteristics of the transistors in the two different gates. In the event that a race condition does exist, it can be prevented by delaying the $\overline{\text{LATCH}}$ input by means of a delay device 58 (FIGURE 3).

It should be noted from the aforementioned description that there is only one stage delay between a change in the LATCH and $\overline{\text{LATCH}}$ inputs and a change in output at the (1) output terminal 88, whereby the circuit arrangement is capable of a much higher speed of operation than an arrangement which employs separate gates of the type shown in FIGURE 1. Furthermore, the use of very low amplitude input signal swings further increases the speed of operation. The circuit is one which lends itself readily to manufacture in monolithic form because all of the transistors are of the same conductivity type, no capacitors are employed, and the low level input signal swings allow design of the circuit for low level power dissipation. With the types of transistors presently available in integrated form, a 0.4 volt forward bias of the collector-base junction has very little effect on switching speed of the transistors. However, when certain other types of transistors are used, this small forward bias of the collector-base junction may cause sufficient lowering of the gain-bandwidth to result in some circuit delay. This condition is avoided in a circuit arrangement of the type illustrated in FIGURE 5.

Figure 5:
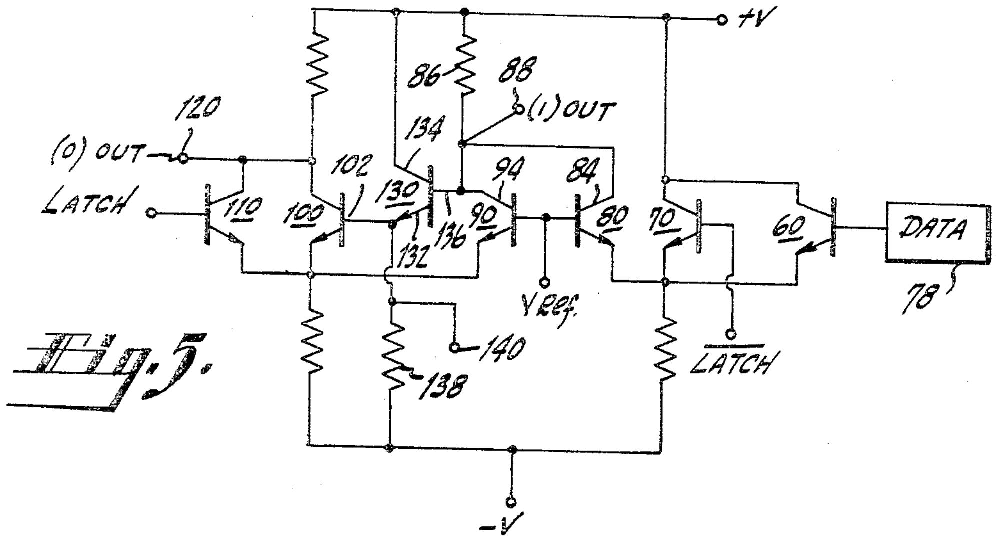
FIGURE 5 is a schematic diagram of another form of latching circuit according to the invention.

The circuit of FIGURE 5 is substantially similar to the circuit of FIGURE 4, with the following exceptions. First, the collectors of the various transistors are connected to a supply voltage of +V volts rather than ground potential. The effect of this change is that the output voltages at terminals 88 and 120 no longer are the same as the input voltages applied at the base electrodes. For example, the voltage at output terminal 88 is at +V volts when the transistors 80 and 90 are nonconducting. This voltage differs from the binary "0" input value previously mentioned, whereby this output voltage cannot be applied directly at the base 102 of transistor 100. To compensate for this change in output voltage level, a seventh transistor 130 is added to the circuit.

Transistor 130, which is of the same conductivity type as the other transistors, is connected as an emitter follower by connecting its collector electrode 134 directly to the +V volt source, and by connecting a resistor 138 between its emitter 132 and the −V volt source. The transistor 130 effects a downward shift in voltage between the collectors 84 and 94 on the one hand, and the base 102 on the other hand. The value of this downward shift is determined by the forward drop across the base 136-emitter 132 junction of the transistor 130. When the binary "0" and "1" inputs have the values previously mentioned, the value of the +V volt source and the common collector resistor 86 are chosen so that the voltage at the junction of collectors 84 and 94 has either a value of +0.7 or +0.3 volt, assuming a 0.7 volt drop across the emitter-base junction of transistor 130. Accordingly, the voltage at the base 102 has either a value of zero volt or a value of −0.4 volt, which values are compatible with the other input voltages. An output terminal 140 may be connected at the emitter 132. The voltage at this terminal is the same as the voltage at the output terminal 88 of FIGURE 4 for the same operating conditions, whereby it may be applied directly to other stages. Alternatively, the outputs at terminals 88 and 120 may be fed to other stages by means of emitter followers which provide proper level restoration.

Operation of the FIGURE 5 circuit is the same as that of the FIGURE 4 circuit described previously and need not be repeated. It should be mentioned that the emitter follower transistor 130 produces a slight delay, on the order of perhaps 0.6 nanosecond. This delay is small compared to the overall circuit delay, whereby it does not have a serious effect on the circuit speed. The small additional delay actually operates to the benefit of the circuit in those instances where a race condition might otherwise be present. This advantage obtains by virtue of the fact that if the $\overline{\text{LATCH}}$ input switches to ground potential before the LATCH input switches to −0.4 volt, transistor 80 may be rendered nonconductive before transistor 90 turns on for the condition where a binary "1" is to be stored. Ordinarily, the effect of this undesirable transition is to render the transistor 100 conductive, whereby transistor 90 cannot turn on and the (1) output will fall to the level representing a binary "0." This possible faulty operation is prevented in the FIGURE 5 circuit by means of the slight additional delay provided by the transistor 130. With the addition of this transistor, transistor 100 does not immediately become conductive if the transistor 80 should turn off before transistor 110 turns off. Accordingly, additional time is allowed for transistor 110 to turn off and render transistor 90 conductive before the feedback from the common collectors 84 and 94 becomes effective at the base 102 of transistor 100.

What is claimed is:

1. The combination comprising:

a first current steering logic gate including first, second and third transistors having their emitters connected together;

a common emitter resistor for said first, second and third transistors;

a second current steering logic gate including fourth, fifth and sixth transistors having their emitters connected together;

a common emitter resistor for said fourth, fifth and sixth transistors;

means connecting the bases of the third and fourth transistors to a source of fixed potential;

a common collector resistor for said third and fourth transistors;

means coupling the base of the fifth transistor to a point common to the collectors of the third and fourth transistors;

means for applying input signals at the base of the first transistor;

means for applying a gating signal at the base of the sixth transistor; and means for applying the complement of the gating signal at the base of the second transistor.

2. The combination as claimed in claim 1, wherein all of said transistors are of the same conductivity type, and including an output terminal connected at a point common to the collectors of the third and fourth transistors.

3. The combination as claimed in claim 1, wherein said input signals have either a first value or a second value more positive and less positive, respectively, than said fixed potential, and wherein the gating signal has one of the first and second values and the complement of the gating signal has the other of the first and second values.

4. The combination as claimed in claim 3, including a common collector resistor for the fifth and sixth transistors, and an output terminal connected at a point common to the collectors of the fifth and sixth transistors.

5. A data latching circuit responsive to data input signals having either a first value or a second value comprising:

first and second emitter coupled current steering logic gates each having three transistors;

means for connecting the bases of a first transistor in each gate to a source of fixed potential having a value intermediate the first and second values;

a common collector supply resistor for the first transistors;

means coupling the base of the second transistor in the second gate to a point common to the collectors of the first transistors;

means for applying data input signals having either the first value or the second value at the base of the second transistor in the first gate; and means for selectively switching the voltage at the base of the third transistor of the second gate from the second value to the first value, and for switching the voltage at the base of the third transistor of the first gate from the first value to the second value.

6. The combination as claimed in claim 5, wherein all of the transistors are of the same conductivity type, and including an output terminal connected at a point common to the collectors of the first transistors.

7. The combination as claimed in claim 5, wherein all of the transistors are of the same one conductivity type, and wherein the coupling means at the base of the second transistor in the second gate includes a further transistor of said one conductivity type connected in the emitter follower configuration and having its base connected at a point common to the collectors of the first transistors, and having its emitter connected to the base of the second transistor in the second gate.

8. The combination as claimed in claim 7, including a common collector resistor for the second and third transistors in the second gate, a first output terminal connected at a point common to the collectors of the first transistors and a second output terminal connected at a point common to the collectors of the second and third transistors in the second gate.

9. The combination as claimed in claim 7, including an output terminal connected at the emitter of said further transistor.

10. A data latching circuit responsive to data input signals having either a first value or a second value comprising:

first and second emitter coupled current steering logic gates each having three transistors;

means for connecting the bases of a first transistor in each gate to a source of fixed potential having a value intermediate the first and second values;

a common collector supply resistor for the first transistors;

means coupling the base of a second transistor in the second gate to a point common to the collectors of the first transistors;

means for applying data input signals having either the first value or the second value at the base of the second transistor in the first gate, signals of the first value being operative to bias the transistor into conduction and signals of the second value being operative to bias the transistor in a nonconducting condition; and means for selectively applying a gating signal of the first value at the base of the third transistor in the second gate, and for applying the complement of the gating signal, having the second value, at the base of the third transistor in the first gate.

11. A data latching circuit responsive to data input signals having either a first value or a second value comprising:

first and second emitter coupled current steering logic gates each having three transistors;

means for connecting the bases of a first transistor in each gate to a source of fixed potential having a value intermediate the first and second values;

a common collector supply resistor for the first transistors;

an additional transistor connected in the emitter follower configuration and having its base connected to a point common to the collectors of the first transistors and having its emitter connected to the base of a second transistor in the second gate;

means for applying data input signals having either the first value or the second value at the base of the second transistor in the first gate; and means for selectively applying a gating signal of the first value at the base of the third transistor in the second gate, and for applying the complement of the gating signal, having the second value, at the base of the third transistor in the first gate.

No references cited.

ARTHUR GAUSS, *Primary Examiner*.

B. P. DAVIS, *Assistant Examiner*.